(12) United States Patent
Mathiassen et al.

(10) Patent No.: US 8,005,275 B2
(45) Date of Patent: Aug. 23, 2011

(54) POINTER TOOL

(75) Inventors: Stig Mathiassen, Oslo (NO); Svein Mathiassen, Heggedal (NO); Jon Nysaether, Oslo (NO)

(73) Assignee: IDEX ASA, Forneby (NO)

( * ) Notice: Subject to any disclaimer, the term of this patent is extended or adjusted under 35 U.S.C. 154(b) by 886 days.

(21) Appl. No.: 11/946,564

(22) Filed: Nov. 28, 2007

(65) Prior Publication Data

US 2008/0129702 A1 Jun. 5, 2008

Related U.S. Application Data (63) Continuation of application No. 10/297,747, filed as application No. PCT/NO01/00244 on Jun. 8, 2001, now Pat. No. 7,308,121.

(51) Int. Cl.
*G06K 9/00* (2006.01)
(52) U.S. Cl. ......... 382/124; 345/157; 345/173; 382/315
(58) Field of Classification Search .................. 382/124, 382/157, 173, 315
See application file for complete search history.

(56) References Cited

U.S. PATENT DOCUMENTS

| | | | |
|---|---|---|---|
| 4,353,056 A | 10/1982 | Tsikos | |
| 5,625,448 A | 4/1997 | Ranalli et al. | |
| 5,673,066 A | 9/1997 | Toda et al. | |
| 5,801,681 A | 9/1998 | Sayag | |
| 5,825,352 A | 10/1998 | Bisset et al. | |
| 5,864,296 A | 1/1999 | Upton | |
| 5,956,019 A | 9/1999 | Bang et al. | |
| 6,002,815 A | 12/1999 | Immega et al. | |
| 6,057,540 A | 5/2000 | Gordon et al. | |
| 6,069,970 A | 5/2000 | Salatino et al. | |
| 6,193,152 B1 | 2/2001 | Fernando et al. | |
| 6,201,886 B1 | 3/2001 | Nakayama | |
| 6,256,022 B1 | 7/2001 | Manaresi et al. | |
| 6,259,108 B1 | 7/2001 | Antonelli et al. | |
| 6,282,303 B1 | 8/2001 | Brownlee | |
| 6,355,937 B2 | 3/2002 | Antonelli et al. | |
| 6,400,836 B2 | 6/2002 | Senior | |
| 6,614,422 B1 | 9/2003 | Rafii et al. | |
| 6,671,392 B1 * | 12/2003 | Shigematsu et al. | 382/124 |
| 6,941,001 B1 | 9/2005 | Bolle et al. | |
| 7,110,579 B2 | 9/2006 | Hashimoto | |
| 7,129,926 B2 | 10/2006 | Mathiassen et al. | |
| 7,184,581 B2 | 2/2007 | Johansen et al. | |
| 7,239,227 B1 * | 7/2007 | Gupta et al. | 340/5.82 |
| 7,239,304 B2 | 7/2007 | Hoshino et al. | |
| 7,308,121 B2 * | 12/2007 | Mathiassen et al. | 382/124 |
| 2007/0146318 A1 | 6/2007 | Juh et al. | |
| 2009/0254869 A1 * | 10/2009 | Ludwig et al. | 715/863 |

FOREIGN PATENT DOCUMENTS

EP 0905646 A1 3/1999

(Continued)

*Primary Examiner* — Gregory M Desire
(74) *Attorney, Agent, or Firm* — Rothwell, Figg, Ernst & Manbeck, P.C.

(57) ABSTRACT

This invention relates to a pointer tool for connecting to a display device, comprising a number of sensors elements being positioned on a two dimensional surface, for measuring a predetermined parameter at a surface, the measured quantity being sampled at a chosen rate, and calculating means for comparing the measurements from the sensor elements for detection of movements in two dimensions over the elements based on changes in the measured parameter, the time between the changes and the known relative positions between the sensor elements.

21 Claims, 5 Drawing Sheets

FOREIGN PATENT DOCUMENTS

| | | | |
|---|---|---|---|
| EP | 0929028 | A2 | 7/1999 |
| EP | 0969477 | A1 | 1/2000 |
| EP | 0973123 | A1 | 1/2000 |
| EP | 1113385 | A2 | 7/2001 |
| EP | 0969477 | B1 | 9/2006 |
| JP | 11194863 | A | 7/1999 |
| WO | 9858342 | A1 | 12/1998 |
| WO | 9943258 | A1 | 9/1999 |

\* cited by examiner

POINTER TOOL

CROSS-REFERENCE TO RELATED APPLICATIONS

This application is a continuation of application Ser. No. 10/297,747, filed on Apr. 29, 2003, the contents of which are hereby incorporated by reference in their entirety.

This invention relates generally to a pointer tool for connecting to a display device and more specifically to motion detection based on signals typically from a finger scanner.

The market of biometrics is evolving rapidly, and the industry is becoming more mainstreamed. However, for biometrics to penetrate the consumer market, requirements are strict in respect to both price and performance (e.g. power consumption).

Currently finger scanners are typically pure capturing devices, hence the responsibility of any signal processing is left to the host. Thus, for implementation in e.g. a mobile phone, requirements are also strict in respect to the use of processing power and memory of the signal processing. Nevertheless, as these processes mature and can be implemented in the finger scanner device, the requirements will still apply.

The size of a matrix finger scanner is typically restricted by the size of the finger images to be captured, due to the number of interconnects if the sensor where to be separated from the IC. Since the price is typically very much proportional to the size of the silicon die, the price of matrix finger scanner can not be expected to decrease significantly. For a stripe finger scanner, however, where the user wipes a finger over one or more arrays of sensor elements, the number of channels is reduced dramatically and separation of sensor and IC is possible, and the size of the IC is not restricted to the size of finger images. The reduction in channels of course also contributes to reduce the size of the die substantially. Since the price and the size of the IC are so related, stripe finger scanners have the potential of breaking the consumer market.

International patent application no. PCT/NO98/00182 describes a stripe finger scanner requiring that the finger is moved over the scanner, which then samples information about the finger surface and generates a two-dimensional representation of the finger image.

For stripe finger scanners, the user must be allowed to pull the finger over the scanner at various velocity. If the finger scanner samples at a fixed rate, this causes for a method that detects the speed of a finger and remaps the rows that are sampled, so that the axes of the remapped finger image are equal and linear.

Menu controlled electronic equipment, such as PDA's or some mobile phones, require some type of control device coupled to the display to enable to user to choose from the menus. This may be performed using pointer tools such as touch sensitive displays, navigation wheels or touch sensitive pads, also adding to the equipment costs. It is an object of this invention to provide a pointer tool based on a fingerprint sensor, the sensor thus obtaining an additional functionality without adding hardware or complicated software to the product.

This object is obtained using a pointer tool as described above, being characterized in that it comprises at least two sensor rows for measuring a predetermined parameter at a surface, and calculating means for correlating the measurements from each sensor row for detection of movements over the sensors based on changes in the measured parameter, and a display device coupled to the calculating means for indicating the measured movements on the display, e.g. as a cursor.

The invention will be described below with reference to the accompanying drawings, illustrating the invention by way of examples.

The typical method for determining the speed of a finger pulled over a stripe finger scanner would be to use auto correlation. This would require one or more additional arrays of sensor elements parallel to the image sensor elements, if the image sensor elements consists of only one array.

Important factors for a speed correction process to run on e.g. a mobile phone, are that it should be fast, require little processing power and use little memory. Preferably it should run in real-time, due to the amount of memory that would be required to buffer a finger image captured of fingers wiped at various velocities, if the speed correction is post-processed.

Figure 1:
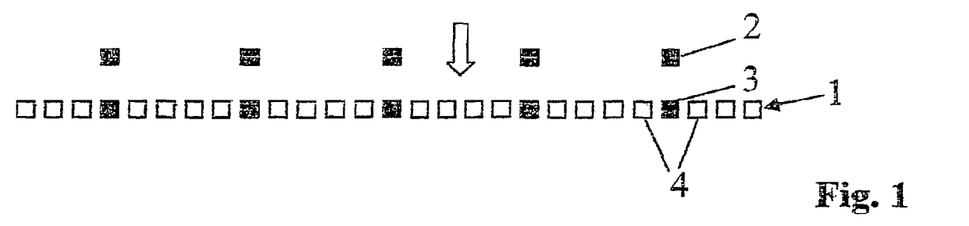
FIG. 1 illustrates schematically a linear fingerprint sensor.

Some facts about e.g. a finger pulled over a finger scanner, can be used to simplify and create a more efficient process for determining the velocity of the finger. FIG. 1 shows a possible layout of sensor elements for such a solution corresponding to the solution described in the abovementioned international patent application PCT/NO98/00182. The layout consists of one array of image sensor elements, and one array of additional speed correction sensor elements. Each additional speed correction sensor element form a pair with a corresponding sensor element in the image sensor element array, as indicated. Since the direction a finger is pulled is known, such a pair can be used to detect the speed of a finger. For enhanced tolerance on the finger pulling direction, adjacent sensor elements on the image array can be used.

The sensors may of course be active continuously, thus measuring any changes close to the sensors at any time, but for use in mobile phones or PDA's a preferable additional features is that at least one touch sensitive sensor is provided which may activate the others automatically. Thus saving the power resources of the equipment. This touch activation may be based on any type of sensor, but is preferably based on the use of at least one of the scanner sensors, e.g. triggering the measurements at a predetermined change in the capacitance of the sensor surroundings.

Figure 2:
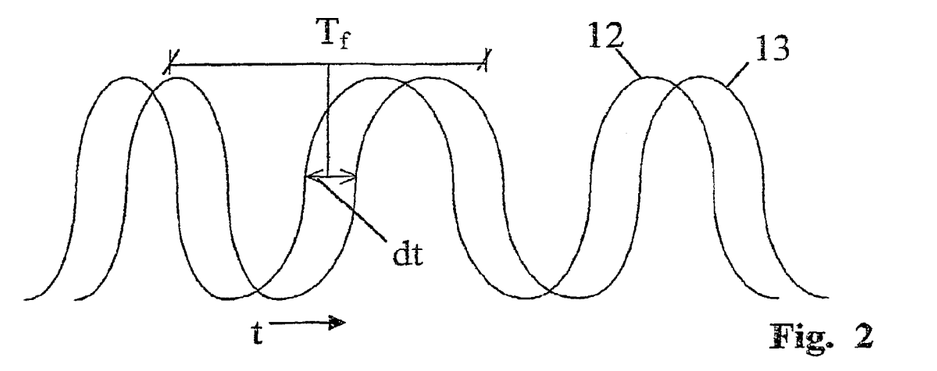
FIG. 2 illustrates a first method for velocity measurements.

An example of a digital readout according to the invention of a speed correction channel pair is shown in FIG. 2. Calibration of any significant variation in offset and gain between the channels should be performed prior to speed correction. The two time series represents the same section of a finger, since the sensor elements are in line with the pulling direction of the finger, where the phase angle between the two signals represents the time the finger uses from the front channel to the back. However, due to variations in velocity of the finger, the sections may be distorted in the time scale.

The range of velocity a user may pull a finger should be set in accordance with what is natural for a human being. When a finger is pulled at a natural speed, the velocity will not vary significantly within one cycle of the signal, i.e. one ridge of the finger surface. Because of this, it is possible to only make a few measurements during one cycle and let these values be valid for a fixed time-frame as indicated in the figure. To get the most exact phase angle, measurements should be done on the flanks of the signal, i.e. where the signal is increasing or decreasing rapidly.

Figure 3:
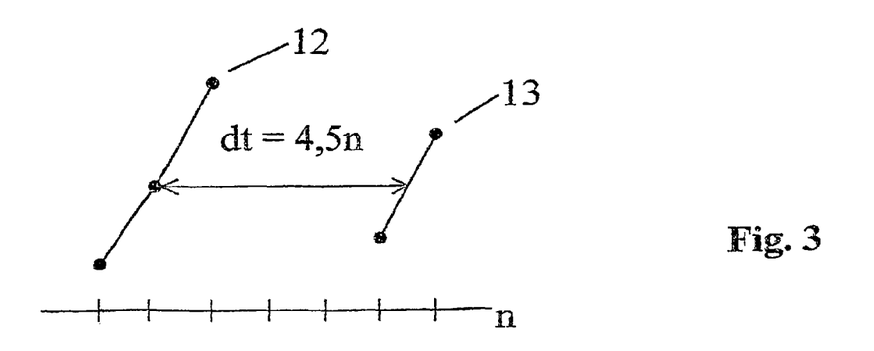
FIG. 3 further illustrates the method in FIG. 2.

As shown in FIG. 3, a sample in the front channel can be selected based on the signal level variation of the two adjacent samples. The pitch of the two sensor elements in a speed correction pair should be less than the smallest pitch expected of the ridges in a finger surface. Thus, whenever the signal in the back channel crosses the level of a sample selected in the front channel, it represents the same point on the finger surface. The calculation of the measurement should be at sub-pixel level for increased accuracy. When the number of samples is known for one point at the surface of the finger to move from the front channel to the back, the speed of the finger can then be expressed as:

$$v=D*F/n$$

where
v is the speed
D is the pitch of the two sensor elements
F is the sampling frequency of one channel
n is the number of samples
The distance the finger has moved during one sampling cycle of a channel, can be express as:

$$d=v/F$$

where
d is the distance the finger has moved during one sampling cycle of a channel
From the two equations we get:

$$d=D/n$$

Since the pitch of the sensor elements of a pair is fixed, the distance the finger has moved during one sampling cycle of a channel, is inversely proportional to the number of samples one point on the surface of the finger uses to move from the front channel to the back. By accumulating the delta distances the finger moves from sample to sample of the same channel, selections can be made of which rows to discard, and which rows to map to the finger image maintain the correct scale, or new values can be calculated from interpolation.

As shown in FIG. 1 a certain number of speed correction pairs should be spread out along the image array. This would be to minimise the possibility that the ridges are parallel to the direction the finger is pulled for all the pairs, which would cause the process to fail to detect any speeds. For those pairs that detects speeds, the results for the different pairs should be averaged for enhanced accuracy. If for some period no speeds are valid, history should be used.

Figure 4:
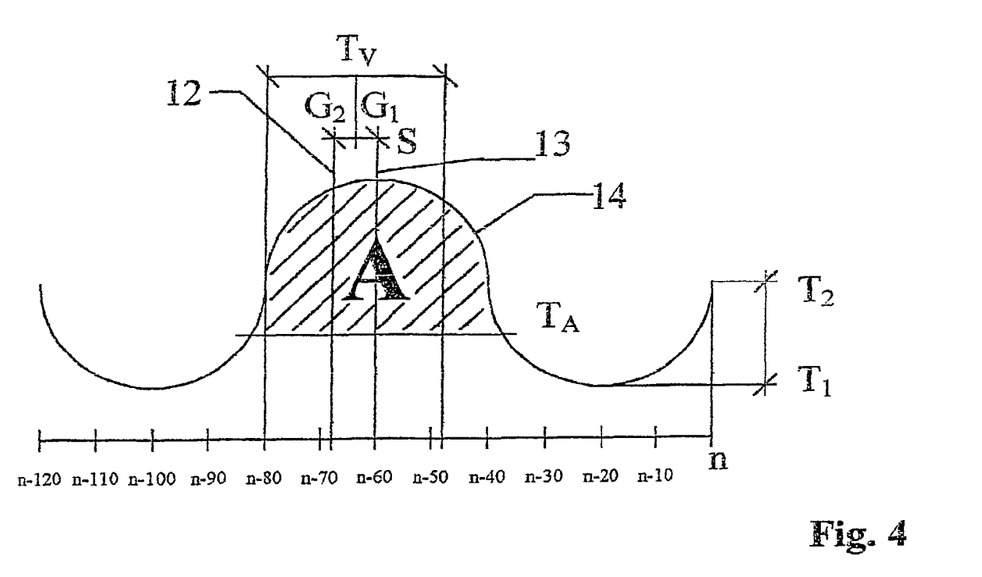
FIG. 4 illustrates an alternative method for measuring velocity.

For the solution described so far, the requirement to the signal quality is relatively strict in respect to signal/noise ratio. For finger scanners that don't provide this signal quality, a similar approach can be used, to the cost of some increase in processing power and memory usage. FIG. 4 shows a sketch of such an approach. Line $T_1$ marks the peak point of a valley of a finger section from a back channel. When a successive sample exceeds a certain threshold $T_2$ from the peak point, that valley will be defined. The area A below the previous ridge is now ready to be defined. This can be done by setting a level $T_A$ e.g. ¾ from the peak point of the ridge to the closer of the peak points of the two alongside valleys. Since the last defined valley does not yet have two ridges alongside, it is not ready to be fully defined until the next ridge is defined.

To complete the definition of the ridge, the area A can be used to compute the vertical axis of gravity $G_1$. Line $G_2$ represents the axis of gravity of the correlating ridge in the front speed channel, as the figure is showing the back channel. The number of samples between $G_1$ and $G_2$ represents the same phase angle as in the approach described above, and hence can be replaced in that description.

Since a finger scanner will not be active for much time in e.g. a mobile phone or Personal Digital Assistant (PDA), the value would be increased substantially if such a unit would include some kind of pointer functionality. The combination of two such modes in one unit is favorable since the modes are exclusively active. Since the mobile phone technology is moving towards graphical displays (opposed to character based displays), with displays growing bigger and number of buttons being reduced, the need for a pointer device is becoming more important. For PDAs this is already the case. Typical pointing devices for mobile phones and PDAs today are navigation keys or pen. The touchpads typically used in portable computers are too large to be convenient for such devices as mobile phones and PDAs.

This invention describes a method for adding the functionality of a pointer into a finger scanner by utilising the structure of the finger. While a touchpad detects a finger being moved over its surface, this method detects the movement of the sensor area over the finger surface. For a stripe finger scanner this requires some additional sensor elements, while for matrix finger scanners a selection of the already existing sensor elements is sufficient. As this mode will be active for a substantial amount of time during the use of a mobile phone or PDA, it is of importance that the number of sensor elements being used is reduced to a minimum, to keep the consumption of power, processor and memory of the host low.

The method for measuring velocity according to this invention may easily be used to detect the direction of the finger, e.g. by using two perpendicular fingerprint scanners and as suggested above comparing the signals from the speed correction sensor not only with the signals from the closest sensor in the array but also with the sensors being close to this, and thus providing a possibility for calculating the angle of the movement.

Figure 5:
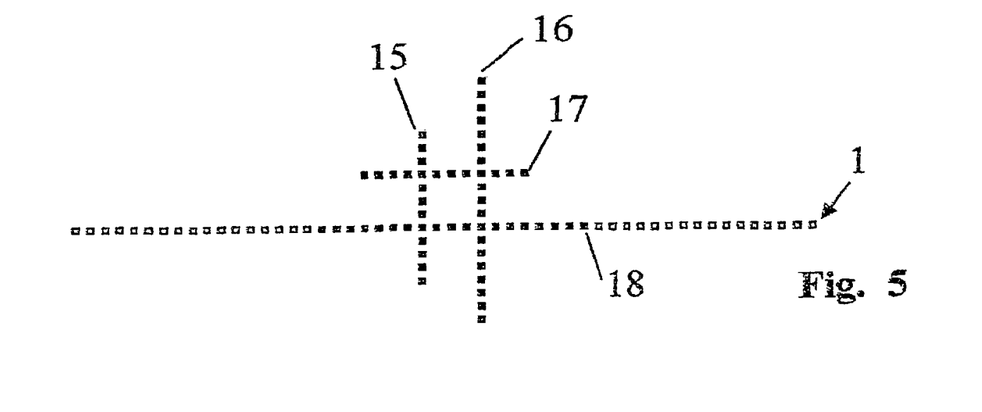
FIG. 5 illustrates a semi linear fingerprint sensor adapted for use as a pointer tool.

An example of a layout of the sensor elements for this method is shown in FIG. 5. The principle of the pointer function is to determine the direction of the finger being moved and then calculate the distance on the basis of the speed of the finger.

When the finger is being moved over the scanner each of the four arrays of elements shown in FIG. 5, two vertical and two horizontal, will scan a section of the finger. The measured values of each sensor element is stored in an array representing the history if each element, the length of said stored history depending on the possible velocities of the moving surface. Each array is then compared to the latest history of the other array on the same axis, to search for an identical section but allowing a displacement of 45. When a match is found the direction is determined and on the basis of the displacement and the axis of the match. In more detail this is performed as follows:

The most current samples from the sensor elements in the left vertical array are subtracted from the most current samples of the uppermost sensor elements in the right vertical array. The sum of the absolute values of these 12 subtractions is stored as an element in a matrix. The same procedure is performed on the left array, with different subsections on the right array moving one sensor element downwards for each time. In this example this will be performed eight times, and the results will be represented as one column in a matrix. This is repeated for a chosen number of times by subtracting the most current samples of the left array from the historic samples of the right array, thus generating a matrix as follows:

$$\begin{bmatrix} \sum_{m=1}^{12} |a_m - b_{m,1}| & \sum_{m=1}^{12} |a_m - b_{m,2}| & \ldots \\ \sum_{m=1}^{12} |a_m - b_{m+1,1}| & \sum_{m=1}^{12} |a_m - b_{m+1,2}| & \ldots \\ \ldots & \ldots & \ldots \\ \sum_{m=1}^{12} |a_m - b_{m+8,1}| & \sum_{m=1}^{12} |a_m - b_{m+8,2}| & \ldots \end{bmatrix}$$

where $a_i$ is the most current sample from element i in the left array and $b_{j,k}$ is sample from element j in the right array where k represents the historic number and k=1 is the most current. The number of rows in the matrix represents the resolution of angle, while the number of columns represents the range and resolution in time of the velocity of a finger. The number of columns and will also set the requirement for buffering of samples.

Figure 6:
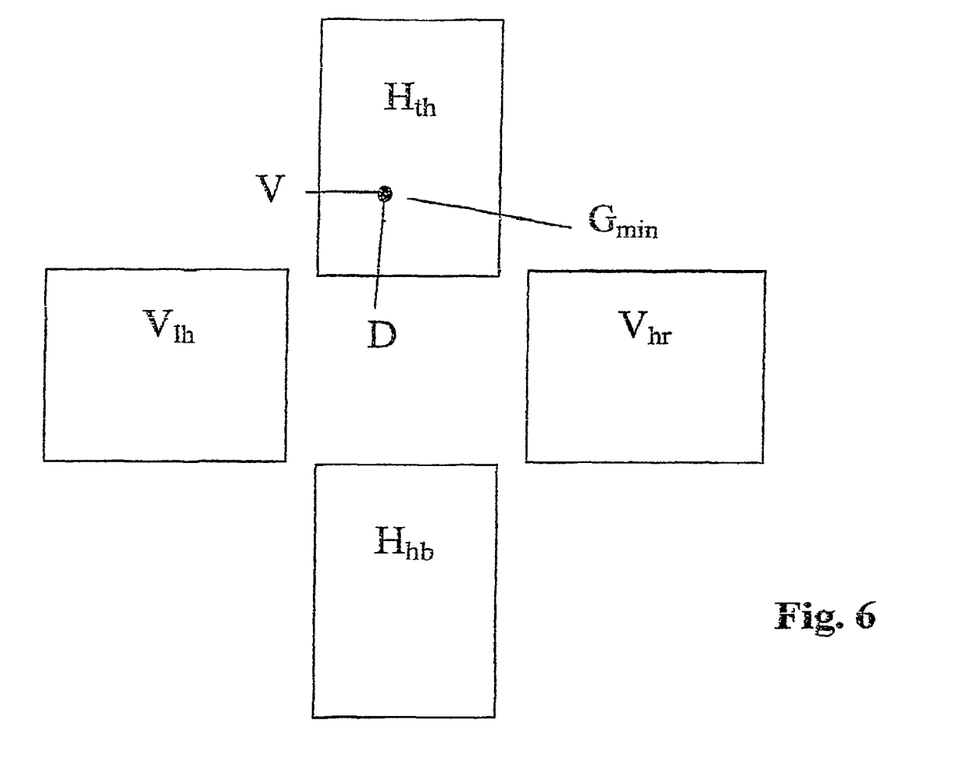
FIG. 6 illustrates the procedure for using the layout illustrated in FIG. 5 for detecting movements in two dimensions.

One more matrix is created where the samples of the most current right array is compared with the history of the left array. Additionally, two similar matrixes are created from the vertical arrays. The global minimum of these four matrixes will represent the current speed and direction of the finger, as shown in FIG. 6. This complete procedure is repeated at a certain rate to detect changes in the motion.

When the speed and direction is initially established, the procedure can zoom in on a smaller range depending on the expected variations and sampling rate.

For enhanced accuracy, time frames of the pixel rows can be used instead of just single rows. The pitch between sensor elements and between the arrays of sensor elements should be optimised for the expected pitch of ridges and valleys in a finger surface, e.g. 50 and 200·m respectively (which results in a sensor area of less than 1 mm$^2$).

Figure 7:
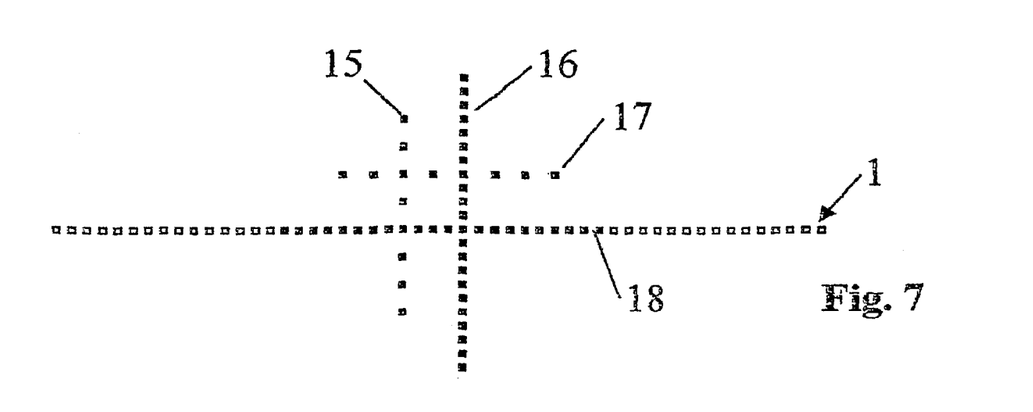
FIG. 7 illustrates an alternative layout for a finger print sensor being usable as a pointer tool.
Figure 8:
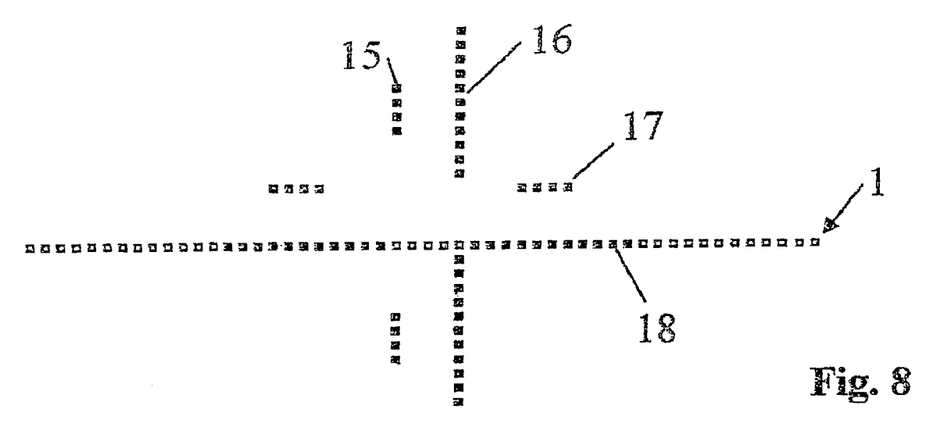
FIG. 8 illustrates an additional alternative layout for a finger print detector pointer tool.
Figure 9:
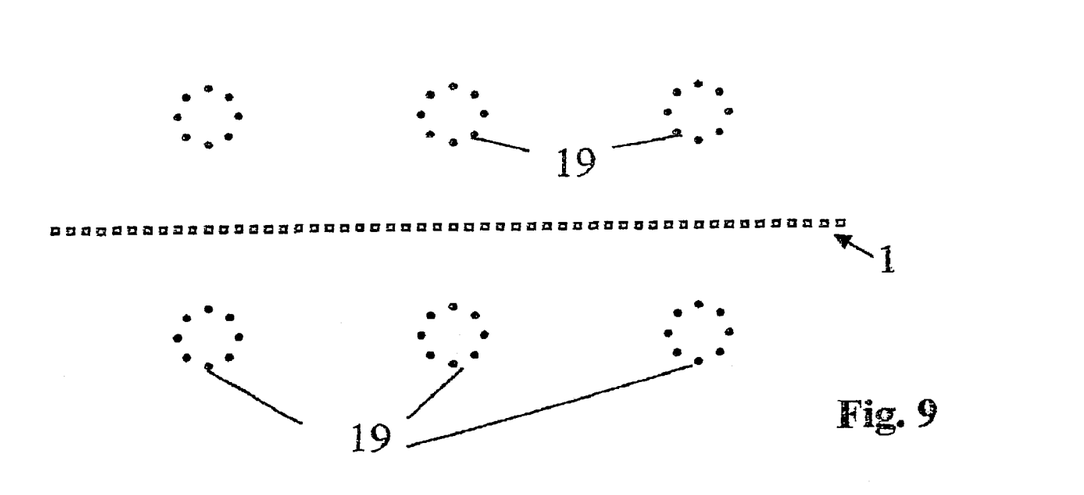
FIG. 9 illustrates an additional alternative layout for a finger print detector pointer tool.

Increased accuracy of speed and direction can be obtained by interpolation of the global minimum. The maximum velocity of a finger is related to the sampling rate. A threshold should be set for the global minimum to detect if the speed is within the operating range. Some sensor elements should be used for finger on/off detection—by e.g. requiring a certain number of these elements to be above a certain threshold—to prevent processing when a finger is off, both in respect to processing power and the fact that all values in the matrixes will be almost zero in that case. This finger on/off detection can also be used to detect taps and double taps by counting the number of samples the finger is on or off (if the sampling rate is fixed), and setting limits for how long the finger is allowed to be on/off. Tap detection can also be replaced by pressure sensing, e.g. by checking changes in time of the total signal level of all sensor elements. FIG. 7, FIG. 8 and FIG. 9 shows alternative layouts of the sensor elements, which requires some more or less changes to the procedure.

For mobile phones with character based displays, the need for a pointer is restricted to a navigator that enables the user to browse menus. This is currently typically solved by the use of keys or a roller drum. Implementation of such a mode for finger scanners, can be done with much less requirements to power consumption, processing power and memory usage.

This embodiment of invention describes a method for a four directional navigation, based on four, or more, additional sensor elements on a stripe finger scanner. The sensor elements should be larger than the image sensor elements, because the structure of the finger surface is regarded as noise in this context. For matrix finger scanners, clusters of image sensor elements can be used to represent a large element.

Figure 10:
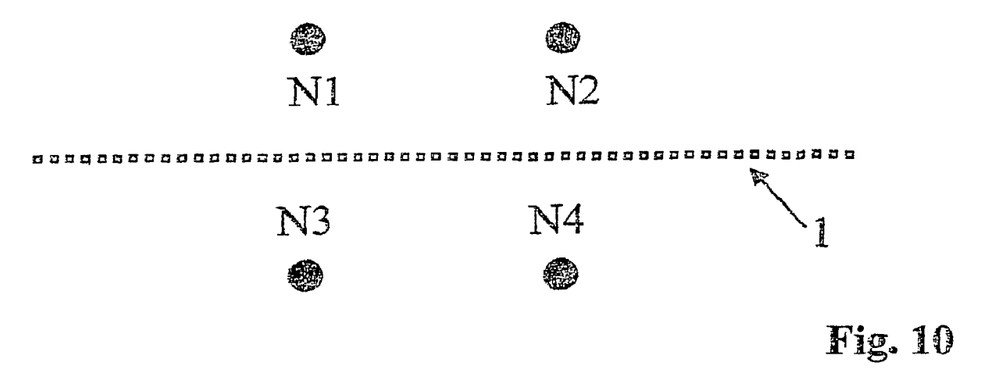
FIG. 10 illustrates a four directional navigation tool.

FIG. 10 shows an example of a layout of such sensor elements. The purpose of the navigation sensor elements is purely to detect the presence of a finger or not, which simply can be solved by a signal level threshold. If a finger is wiped over the sensor area, the four navigation sensor elements will be triggered at certain points in time. The direction of the finger wipe is given by the two first elements that are triggered, i.e. if N1 and N2 are triggered first, the direction is down; if N1 and N3 are triggered first, the direction is right; if N2 and N4 are triggered first, the direction is left; and if N3 and N4 are triggered first, the direction is up. Additionally a check can be done on the difference in time between the first and the second and the first and the third element are triggered. If these time differences are almost equal, the wipe can be disregarded because the finger has been wiped close to a borderline between two of the four directions. The setting of a threshold for an acceptable factor between these two differences, represents the tolerance of the angle a user may wipe the finger in a direction. Furthermore, if a threshold is set for a minimum of the time difference between the first and the third sensor elements are triggered, the process can distinguish between wipes in a direction and a tap. Timing of the presence and absence of a finger enables detection of single and double taps. Also, a scrolling feature can be implemented in such a way that if a finger is wiped onto the sensor area and detected as a valid direction, and the finger is kept on the sensor area, after a certain time the procedure can interpret this as repetitive wipes in the same direction, and at a certain rate.

The number of sensor elements can be increased or decreased to adapt for more or less directions, i.e. two sensor elements can detect two directions, while 8 sensor elements, e.g. aligned in a circle, can detect 8 directions.

This invention is described as primarily based on a finger print scanner of the type described in International patent application no. PCT/NO98/00182 thus primarily on capacitance measurements on a finger surface. It is, however, clear that the invention may use different finger scanner technology, such as thermal, within the scope of this invention.

The invention claimed is:

1. Pointer tool for connecting to a display device, comprising:
   a plurality of sensor elements, positioned on a two-dimensional surface to form at least one linear image array and at least one linear correction array, to measure the presence of a fingertip surface at a chosen sample rate,
   storing means to store the measurements from each sensor element over time to create a sample history for each sensor element, and
   calculating means to calculate the direction of motion of the fingertip surface based on the respective sample histories and relative positions of the plurality of sensor elements.

2. Pointer tool according to claim 1, wherein said calculating means is further adapted to compare the most recent samples of each sensor element with the sample history of a chosen number of the other sensor elements to calculate the direction of motion of the fingertip surface relative to the plurality of sensor elements.

3. Pointer tool according to claim 1, wherein the linear image array defines a linear finger scanner.

4. Pointer tool according to claim 1, wherein the sensor elements define two perpendicular pairs of sensor element arrays.

5. Pointer tool according to claim 1, further comprising a display device coupled to the calculating means for indicating the measured directions on the display.

6. Pointer tool according to claim 1, wherein at least one sensor element is adapted to respond to measured values exceeding a predetermined value to sense the presence of the fingertip surface.

7. Pointer tool according to claim 6, wherein further comprising means for measuring the time of the presence of the fingertip surface and the time between the responses, so as to recognize taps, or double taps on the plurality of sensor elements.

8. Pointer tool according to claim 1, consisting of one linear image array, one parallel speed correction array and two perpendicular sensor arrays.

9. Pointer tool according to claim 1, wherein the linear image array and the linear correction array are disposed perpendicular to one another.

10. Pointer tool for connecting to a display device, comprising:
a plurality of sensor elements, positioned on a two-dimensional surface with known distances between the sensor elements, adapted to measure a predetermined parameter of a finger surface at a chosen rate, a first portion of the plurality of sensor elements forming a linear fingerprint sensor array and a remaining portion of the plurality of sensor elements being displaced from the linear fingerprint sensor array in a perpendicular direction;
storing means for storing the measurements from each sensor element to provide a set of samples from each sensor element; and
calculating means for comparing the samples from each sensor element with the samples from other sensor elements and for calculating a direction of motion of the finger surface in two dimensions.

11. Pointer tool for connecting to a display device, comprising:
a plurality of sensor elements, positioned on a two-dimensional surface to form a matrix fingerprint scanner, to measure the presence of a fingertip surface at a chosen sample rate,
storing means to store the measurements from each sensor element over time to create a sample history for each sensor element, and
calculating means to calculate the direction of motion of the fingertip surface based on the respective sample histories and relative positions of the plurality of sensor elements.

12. A pointer tool for a display device, comprising:
a plurality of finger sensor elements disposed within a first pair of parallel arrays and a second pair of parallel arrays, the first and second array pairs arranged perpendicularly;
a memory to store measurements from each sensor element over time to create a sample history for each sensor element, and
a processor, coupled to the memory and the finger sensor elements, to determine a direction of finger motion over the finger sensor elements based on relative positions and respective sample histories of the sensor elements.

13. The pointer tool of claim 12, wherein the first array pair includes a left array and a right array, and the second array pair includes a top array and a bottom array, wherein the right array has a greater number of sensors than the left array, and the bottom array has a greater number of sensors than the top array.

14. The pointer tool of claim 13, wherein the left array and the top array include at least 8 finger sensor elements.

15. The pointer tool of claim 12, wherein the memory stores a matrix of summed sensor differences for each array, in which historic samples from one array within an array pair are subtracted from current samples of the other array within the array pair and summed together.

16. The pointer tool of claim 15, wherein the number of rows in each matrix represents an angular resolution of the direction of finger motion over the finger sensor elements.

17. The pointer tool of claim 16, wherein the processor determines a speed of finger motion over the finger sensor elements based on relative positions and respective sample histories of the sensor elements.

18. The pointer tool of claim 17, wherein the number of columns in each matrix represents a range and a temporal resolution of the speed of finger motion over the finger sensor elements.

19. The pointer tool of claim 18, wherein the global minimum of the matrices represents the direction and the speed of the finger motion over the finger sensor elements.

20. The pointer tool of claim 12, wherein the processor determines whether a finger is proximate to the finger sensor elements based on whether a subset of the finger sensor element measurements exceed a predetermined threshold.

21. The pointer tool of claim 20, wherein the processor determines whether a finger has tapped the finger sensor elements based on the number of samples in the sample histories that exceed the predetermined threshold.

* * * * *